United States Patent [19]

Fujigaki

[11] Patent Number: 5,732,786

[45] Date of Patent: Mar. 31, 1998

[54] MANUAL DRIVING FORCE SENSING UNIT FOR MOTOR DRIVEN VEHICLE

[75] Inventor: Motoharu Fujigaki, Kobe, Japan

[73] Assignee: Nabco Limited, Kobe, Japan

[21] Appl. No.: 798,804

[22] Filed: Feb. 12, 1997

Related U.S. Application Data

[62] Division of Ser. No. 477,039, Jun. 7, 1995, abandoned.

[30] Foreign Application Priority Data

Jul. 6, 1994 [JP] Japan .................................. 6-179487
Aug. 4, 1994 [JP] Japan .................................. 6-204573

[51] Int. Cl.$^6$ .................................. B62D 51/04
[52] U.S. Cl. .................................. 180/19.3; 180/65.1
[58] Field of Search .................................. 180/65.1, 65.8, 180/19.3, 19.1, 19.2; 280/250.1, 304.1; 74/551.9

[56] References Cited

U.S. PATENT DOCUMENTS

| | | |
|---|---|---|
| 2,937,706 | 5/1960 | Chandler . |
| 3,225,853 | 12/1965 | Norton et al. . |
| 3,477,536 | 11/1969 | Carini . |
| 3,712,399 | 1/1973 | Ruffle et al. . |
| 3,814,199 | 6/1974 | Jones .................................. 180/907 |
| 3,896,892 | 7/1975 | Kohis et al. .................................. 180/19.1 |
| 4,281,734 | 8/1981 | Johnston .................................. 180/6.5 |
| 4,979,582 | 12/1990 | Forster . |
| 5,103,125 | 4/1992 | Ogden .................................. 310/72 |
| 5,246,082 | 9/1993 | Alber . |
| 5,366,037 | 11/1994 | Richey . |
| 5,406,674 | 4/1995 | Lawter et al. .................................. 180/19.3 |
| 5,409,074 | 4/1995 | Wilson et al. .................................. 180/65.1 |
| 5,427,193 | 6/1995 | Avakian . |
| 5,504,971 | 4/1996 | Mccormick .................................. 180/19.3 |

FOREIGN PATENT DOCUMENTS

| | | |
|---|---|---|
| 0061875 | 10/1982 | European Pat. Off. . |
| 9311075 | 11/1994 | Germany . |
| 1172826 | 12/1989 | Japan . |
| 315468 | 1/1991 | Japan . |
| 4-143123 | 5/1992 | Japan .................................. 180/65.5 |
| 2224984 | 5/1990 | United Kingdom . |
| 2269145 | 2/1994 | United Kingdom . |
| 2279923 | 1/1995 | United Kingdom . |

OTHER PUBLICATIONS

European Search Report for Application No. EP 95 30 3856, completed 17 Jan. 1996.

Proceedings of the Annual International Conference of the IEEE Engineering in Medicine and Biology Society, vol. 13, No. 4, 1991, Orlando, Florida, USA.

*Primary Examiner*—Brian L. Johnson
*Assistant Examiner*—Gary Savitt
*Attorney, Agent, or Firm*—Duane, Morris & Heckscher, LLP

[57] ABSTRACT

A motor-driven vehicle includes a vehicle body including a handlebar, a drive wheel mounted to the vehicle body, a driving unit for driving the drive wheel, and a manual-driving-force sensing unit for sensing a manual driving force exerted to the handlebar to move the vehicle body and generating a control signal for controlling the driving unit in accordance with the sensed manual driving force. The manual-driving-force sensing unit includes a displaceable grip mounted displaceable along the length of said handlebar, a potentiometer for sensing displacement of the grip and generating the control signal in accordance with the sensed displacement of the grip, first and second stop members disposed spaced from each other along the length of the handlebar, a spring having one end contacting the first stop member and having the other end contacting the second stop member, and a piston having first and second portions adjacent to said first and second stop members, respectively, for driving the spring.

6 Claims, 18 Drawing Sheets

F I G. I  Prior Art

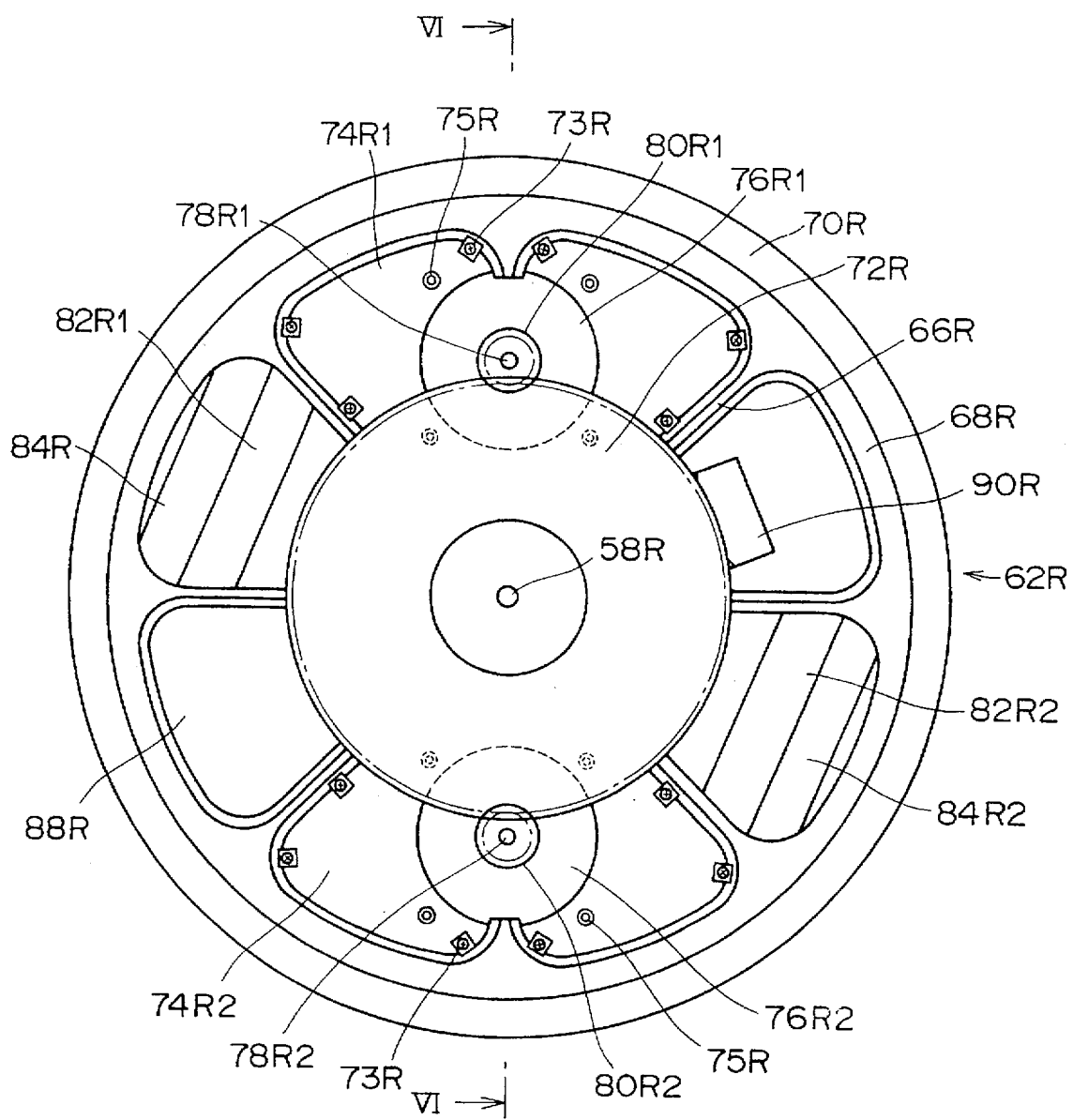
F I G. 5

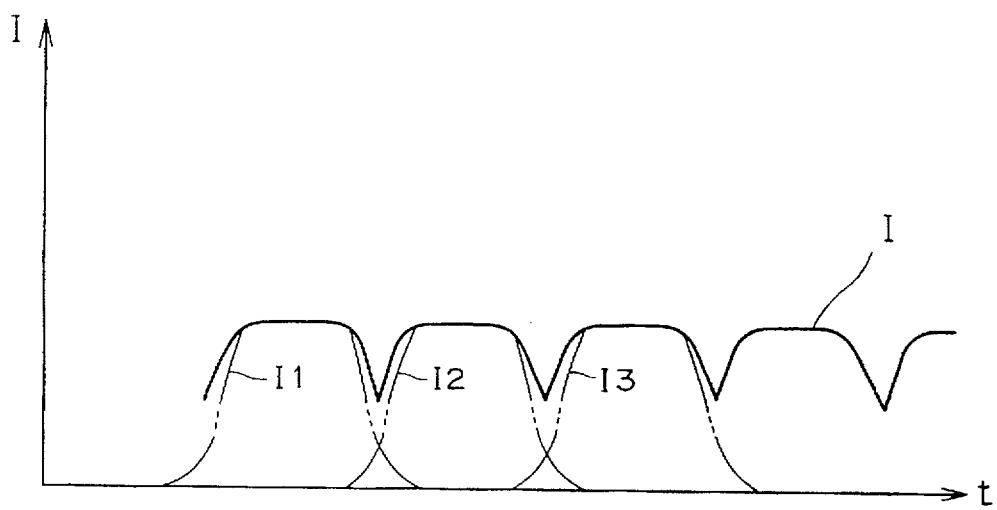
F I G. 9

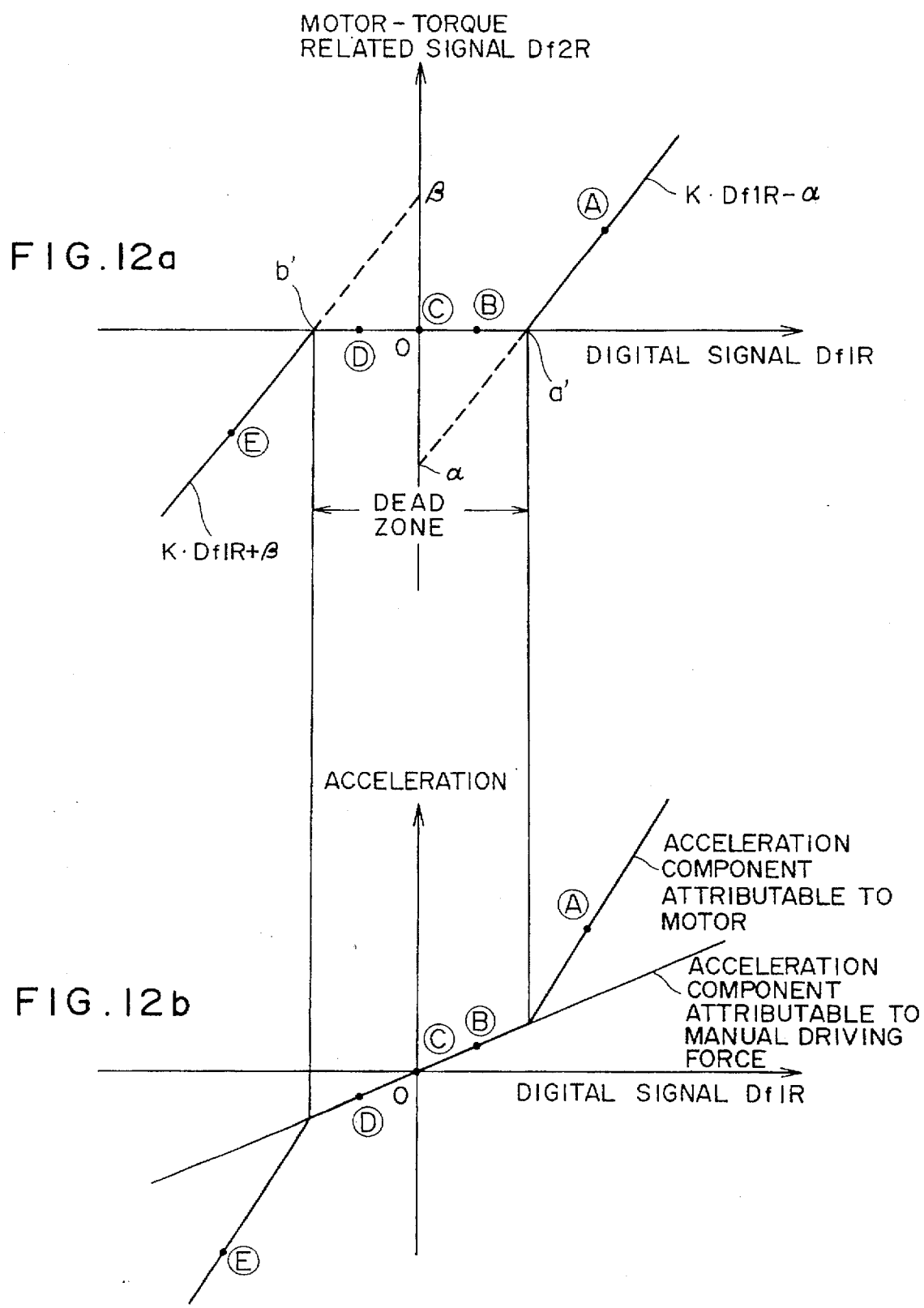

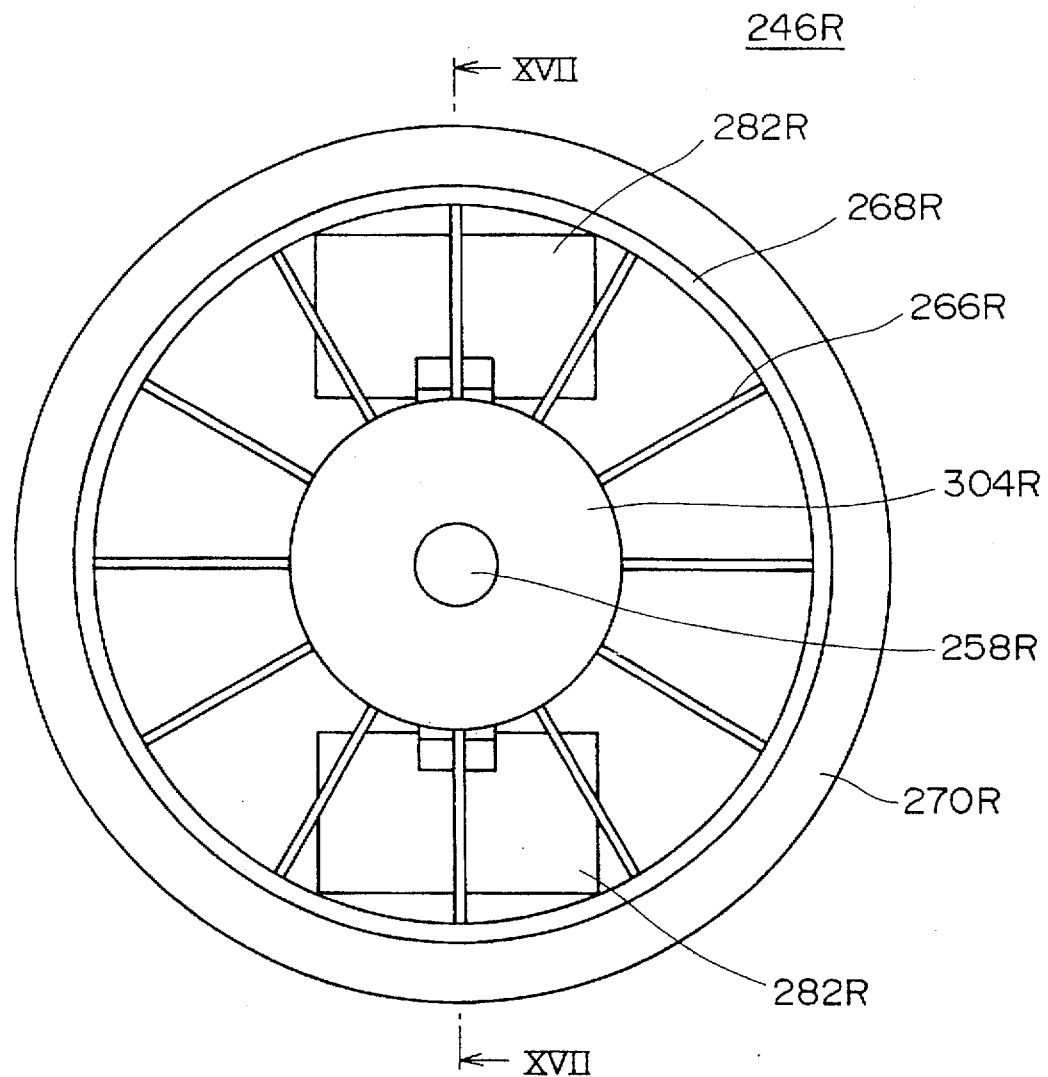
F I G. 16

MANUAL DRIVING FORCE SENSING UNIT FOR MOTOR DRIVEN VEHICLE

This application is a divisional of application Ser. No. 08/477,039 filed on Jun. 7, 1995, which is abandoned.

The present invention relates to a motor-driven vehicle, such as a motor-driven wheelchair.

BACKGROUND OF THE INVENTION

An example of prior art motor-driven wheelchairs is shown in FIG. 1. A wheelchair 2 includes a chair body 4 which is formed by a pipe framework. The body 4 includes handlebars 8 with handlegrips 6, a back 10, a seat 12, armrests 14, and footrests 16. The chair body 4 is provided with a pair of drive wheels 18 and a pair of follower wheels 20. For each of the drive wheels 18, a motor 20 is used which is coupled through a gear transmission (not shown) to the drive wheel 18. The motors 20 may be geared DC motors. A clutch is provided in association with each motor 20 or each gear transmission, and, when the clutch is operated, the associated drive wheel 18 can be freely rotatable. With the respective clutches operated, an attendant or helper, gripping the handgrips 6, can push or pull the chair body to move the wheelchair forward or backward by human power.

A control unit 22 is also provided on the chair body 4. The control unit 22 includes a joystick 24 for use in steering the wheelchair 2. The control unit 22 controls the respective motors 20 to move the wheelchair 2 in the direction corresponding to the direction in which the joystick 24 is tilted. A battery 26 is also mounted on the chair body 4 for supplying power to the motors 20 and the control unit 22. The battery 26 may be, for example, an automobile chargeable lead-acid battery.

The motor-driven wheelchair 2 is either motor-driven by means of the motors 20 or driven by human power. In the latter case, the clutches are decoupled from the motors.

The motor-driven wheelchair 2 can be used by a person handicapped or weak not only in the lower half of their body, but also in the upper half of the body.

FIG. 2 shows a manually driven wheelchair 2a, which may be used by a person whose upper half of the body is not weak. The same reference numerals as used in FIG. 1 are used for corresponding parts of the wheelchair 2a of FIG. 2, and no explanation about them is made. The wheelchair 2a employs rear wheels 18a which have a diameter considerably larger than that of the drive wheel 18 shown in FIG. 1, but it is provided with none of motors, a control unit, batteries and the likes which are required for a motor-driven wheelchair. A ring-shaped hand rim 28 having a diameter smaller than that of the rear wheels 18a is mounted coaxial with the associated one of the rear wheels 18a. The wheelchair 2a moves forward or backward when a person on the wheelchair 2a rotates the hand rims 28 by hands in one or opposite direction to thereby rotate the rear wheels 18a.

As previously stated, the motor-driven wheelchair 2 shown in FIG. 1 is either driven by the motors 20 or by an attendant. In the latter case, the clutches are decoupled from the motors 20. However, when a user or handicapped sits on the seat, the sum of the weights of the user and the wheelchair may be a hundred and several tens of kilograms and, therefore, an attendant can move the wheelchair with a person sitting only on a horizontal, flat surface. Accordingly, even when a helper is attending, the motors 20 are very often used to drive the wheelchair 2, and, therefore, the battery power is consumed rapidly, which requires the battery 26 to be frequently charged.

A motor-driven wheelchair of the type shown in FIG. 1 is frequently used by a person, such as an old person, who is weak not only in the upper limbs but in the lower limbs. On the other hand, a wheelchair of the type shown in FIG. 2 is usually used by a person whose upper limbs are still strong. When he or she begins to feel failure in strength of the upper limbs, he or she may want to modify the wheelchair into a motor-driven wheelchair of the type shown in FIG. 1. However, because the structures of the wheelchairs shown in FIGS. 1 and 2 are quite different from each other, it is almost impossible to make modification, and, therefore, the wheelchair 2a must be thrown away, and a new motor-driven wheelchair must be obtained.

An object of the present invention is to provide a motor-driven vehicle, such as a motor-driven wheelchair, which can be operated with ease by human power and in which power consumed by motors for driving the vehicle can be reduced by taking advantage of human power given by a person to drive the vehicle, with no increase in burden placed on the person who drives the vehicle.

Another object of the present invention is to provide a structure of a motor-driven vehicle which enables an ordinary manually driven vehicle to be re-built into a motor-driven vehicle by making simple modifications to the manually driven vehicle.

SUMMARY OF THE INVENTION

According to the present invention, a motor-driven vehicle includes a vehicle body, drive wheels mounted on opposite sides of the vehicle body, electrical driving means disposed within each of the drive wheels, and batteries disposed within the drive wheels for supplying electric power to the electrical driving means.

The motor-driven vehicle may include control means disposed within the drive wheels for controlling the electrical driving means. The motor-driven vehicle may also include wireless signal transmitting means mounted on the vehicle body for transmitting driving means control signals by wireless, and signal receiving means disposed on the drive wheels for receiving control signals transmitted by the wireless signal transmitting means and supplying the received control signals to the control means.

The signal transmitting means may include at least one light-emitting means which transmits the control signal in the form of a light signal to the signal receiving means associated with each drive wheel. The light-emitting means is disposed in the vicinity of the drive wheel. The signal receiving means may includes a plurality of light-receiving means equidistantly disposed on each drive wheel on a circle which is concentric with the drive wheel. Thus, the light-receiving means rotate with the drive wheels about the rotation axis of the drive wheels. The light-receiving means are arranged to pass through an area in the vicinity of the light-emitting means when the drive wheels are driven to rotate. The spacing between adjacent ones of the light-receiving means is such that, at any time, one or more light-emitting means is located within a detectable range determined by the angle of emission of light-signals by the light-emitting means and the minimum light signal intensity which the light-receiving means can detect.

Each of the drive wheels may include an axle secured to the body, and a rotating section rotatably supported on the axle. The driving means disposed within each drive wheel may includes a gear secured to the axle, a plurality of pinions meshing with and rolling around the gear, and a plurality of motors having their shafts coupled to associated ones of the plurality of pinions. The motors are disposed at locations spaced by an equal angle from each other on a circle concentric with the axle, and a plurality of batteries may be disposed at locations spaced by an equal angle from each other on a circle concentric with the axle, which locations are different from the locations of the motors. Also, a plurality of control means may be disposed at locations spaced by an equal angle from each other on a circle concentric with the axle, which locations are different from the locations of the motors and the locations of the batteries. The motors, the batteries, and the control means are disposed to lie in a plane which is generally perpendicular to the axis of the axle.

In another embodiment of the present invention, each of the drive wheels of the motor-driven vehicle includes an axle secured to the vehicle body, and a rotating section rotatably supported on the axle. Each of the driving means includes a magnet secured to the axle, and a coil disposed to surround the magnet. The coil is mounted on the rotating section. The battery is disposed outward of the coil.

A hand rim may be attached to each drive wheel.

A motor-driven vehicle embodying another aspect of the present invention includes a vehicle body with handlebars attached to it, drive wheels mounted on the vehicle body on opposite sides of the body, driving means for driving the respective drive wheels, and manual-driving-force sensing means for sensing manual driving forces exerted to the vehicle through the handlebars and for generating control signals to be supplied to the respective driving means. Each of the manual-driving-force sensing means includes a grip mounted on its associated handlebar and displaceable along the length direction of the handlebar, displacement sensing means for sensing the displacement of the grip and generating the control signal in accordance with the magnitude of the displacement of the grip, and elastic means having two ends, one of which is restricted in motion along the length direction of the handlebar and the other of which receives a compression force depending on the amount of displacement of the grip when the grip is displaced in one direction, said other end being restricted in motion along the length of the handlebar and said one end receiving a compression force depending on the amount of displacement of the grip when the grip is displaced in an opposite direction.

The displacement sensing means may be arranged to sense not only the amount of displacement but the direction of displacement of each grip. In such a case, each of the elastic means is disposed between two spaced-apart stops. Each grip has a first actuating section which presses against one end of the elastic means when the grip is displaced in one direction along the length of the handlebar from its neutral position, and has a second actuating section which presses against the other end of the elastic means when the grip is displaced in the opposite direction from its neutral position. The elastic means may be arranged to be in a compressed state when the grip is not displaced and, therefore, in its neutral position.

The motor-driven vehicles have been described to include two drive wheels disposed on opposite sides of a chair body, but only one drive wheel may be used. In such a case, it is disposed at the midpoint between the opposite sides of the vehicle. Then, one handlebar, one manual-driving-force sensing means, and one control means may be used, accordingly.

BRIEF DESCRIPTION OF THE DRAWINGS

FIG. 5 is a right side view of a right-side drive wheel of the motor-driven wheelchair shown in FIG. 3;

FIG. 9 shows waveforms of currents in the phototransistors receiving light, and a combined current in the arrangement shown in FIG. 8;

FIG. 12a shows a relationship between manual driving force exerted to the wheelchair of FIG. 3 and a motor-torque related signal from which a signal to be applied to a motor driving the drive wheel is prepared;

FIG. 12b shows a relationship between manual driving force exerted to the wheelchair of FIG. 3 and acceleration of the wheelchair;

FIG. 16 is a right side view of a right-side drive wheel of a motor-driven wheelchair according to a third embodiment of the present invention.

DETAILED DESCRIPTION OF EMBODIMENTS

Figure 3:
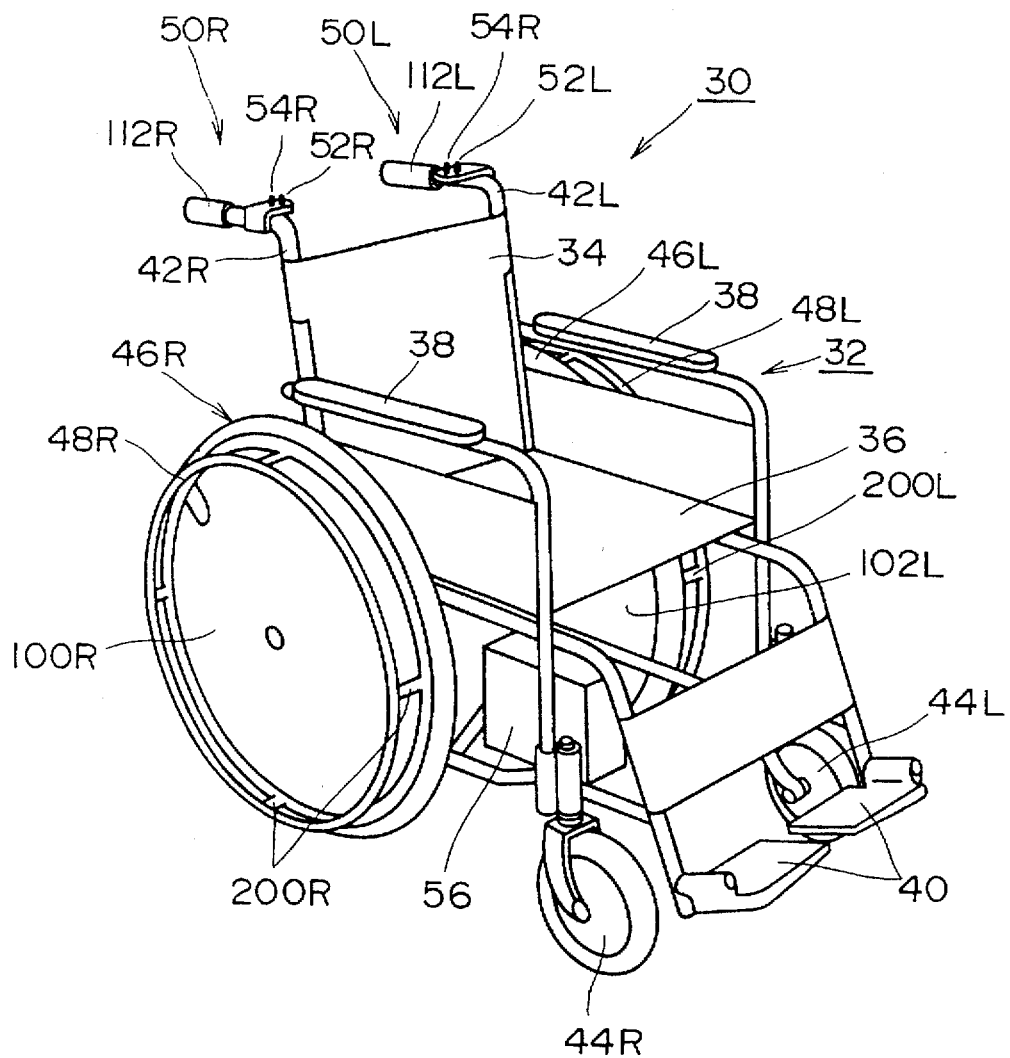
FIG. 3 is a perspective view of a motor-driven wheelchair according to a first embodiment of the present invention.

FIG. 3 shows a motor-driven vehicle, for example, a motor-driven wheelchair 30 according to a first embodiment of the present invention. The wheelchair 30 includes a chair body 32 built by a pipe framework, for example. The chair body 32 is provided with a back 34, a seat 36, armrests 38, and footrests 40. Handlebars 42R and 42L extend rearward from the right and left sides of the rear of the pipe framework. (Throughout the specification, letters "R" and "L" represent "right" and "left" respectively. Thus, the handlebar 42R, for example, is the one on the right side of the wheelchair 30.) A pair of right and left follower wheels 44R and 44L are rotatably mounted on the pipe framework on its right and left sides of the front lower portion. In the rear portion of the pipe framework, a pair of right and left drive wheels 46R and 46L are mounted on the right and left sides of the pipe framework. The diameter of the drive wheels 46R and 46L are larger than that of follower wheels 44R and 44L. Outside the respective drive wheels 46R and 46L, annular hand rims 48R and 48L made of pipes are secured via spacers 200R and 200L to the drive wheels. The diameter of the hand rims 48R and 48L is slightly smaller than that of the drive wheels 46R and 46L.

Figure 4:
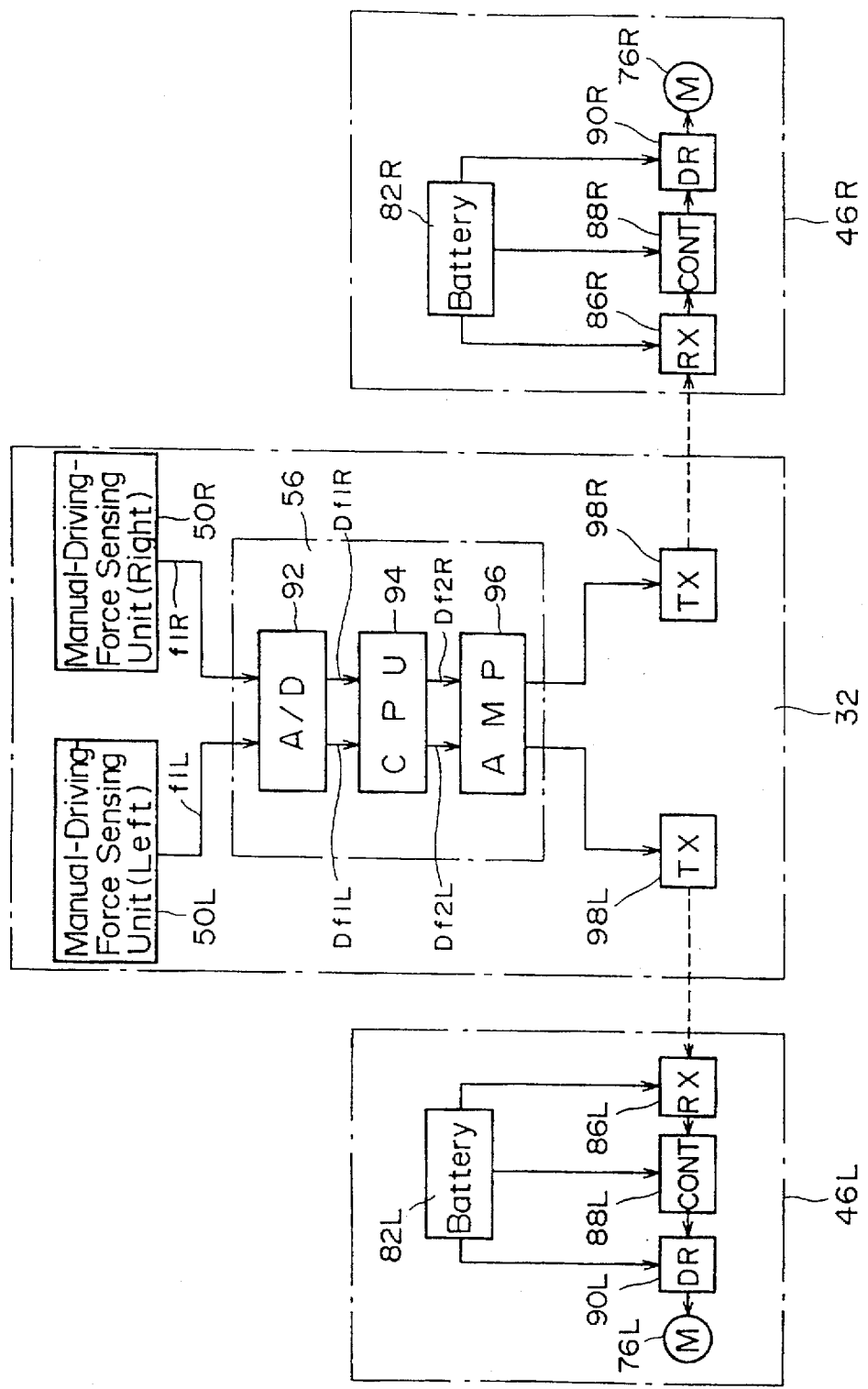
FIG. 4 is a representation in a block diagram of the motor-driven wheelchair shown in FIG. 3.

As will be explained later in detail with reference to FIG. 4, within the respective drive wheels 46R and 46L, there are disposed motors 76R and 76L for driving the drive wheels 46R and 46L, as well as signal receiver (RX) units 86R and 86L, control (CONT) units 88R and 88L, and driving (DR) units 90R and 90L, which are used to control the motors (M) 76R and 76L, respectively, and also batteries 82R and 82L for feeding power to the motors and respective units.

A pair of manual-driving-force sensing units 50R and 50L are provided on the handlebars 42R and 42L. The manual-driving-force sensing unit 50R senses a manual driving force exerted to it and develops an analog electrical signal f1R representative of the magnitude and direction of the exerted manual driving force, while the manual-driving-force sensing unit 50L senses a manual driving force exerted to it and develops an analog electrical signal f1L representative of the magnitude and direction of the exerted manual driving force. Indicator lamps 52R and 52L indicating that the wheelchair 30 is moving forward, and indicator lamps 54R and 54L indicating that the wheelchair 30 is moving backward may be mounted on the respective handlebars 42R and 42L.

Beneath the seat 36 of the chair body 32, there is provided a signal converting unit 56 which converts signals from the manual-driving-force sensing units 50R and 50L into motor control signals. As shown in FIG. 4, the signal converting unit 56 includes an analog-to-digital (A/D) converter 92 which converts the analog electrical signal f1R and f1L into digital electrical signals Df1R and Df1L, respectively. The digital signals Df1R and Df1L are applied to a central processor unit (CPU) 94 where they are converted into digital driving signals or digital motor-torque related signals Df2R and Df2L for the respective motors 76R and 76L. The digital motor-torque related signals Df2R and Df2L are amplified by an amplifier 36. The digital motor-torque related signal Df2R is applied to a transmitter (TX) unit 98R for the drive wheel 46R, and the digital motor-torque related signal Df2L is applied to a transmitter (TX) unit 98L for the drive wheel 46L. The transmitter units 98R and 98L may be light-transmitter which include light-emitting elements, such as, infra-red light emitting diodes, and transmit light signals, such as infrared signals, to receiver units 86R and 86L, respectively.

The receiver units 86R and 86L may be light-receivers including light-receiving elements, such as phototransistors, which receive and demodulate light-signals transmitted by the associated transmitters 98R and 98L and produce the digital motor-torque related signals Df2R and Df2L. The digital motor-torque related signals Df2R and Df2L are applied to the control units 88R and 88L, respectively. The control units 88R and 88L may modulate the pulse widths of voltages which are applied to the motors 76R and 76L, respectively, with the torque-related signals Df2R and Df2L, and apply the pulse-width modulated voltage signals to the driving units 90R and 90L, to thereby vary the values of current to be applied to the motors 76R and 76L so that the torques of the motors 76R and 76L vary. Thus, the driving units 90R and 90L and the control units 88R and 88L form control means. The drive wheels 46R and 46L are independently controlled in accordance with the manual driving forces sensed by the associated manual-driving-force sensing units 50R and 50L, respectively.

Figure 6:
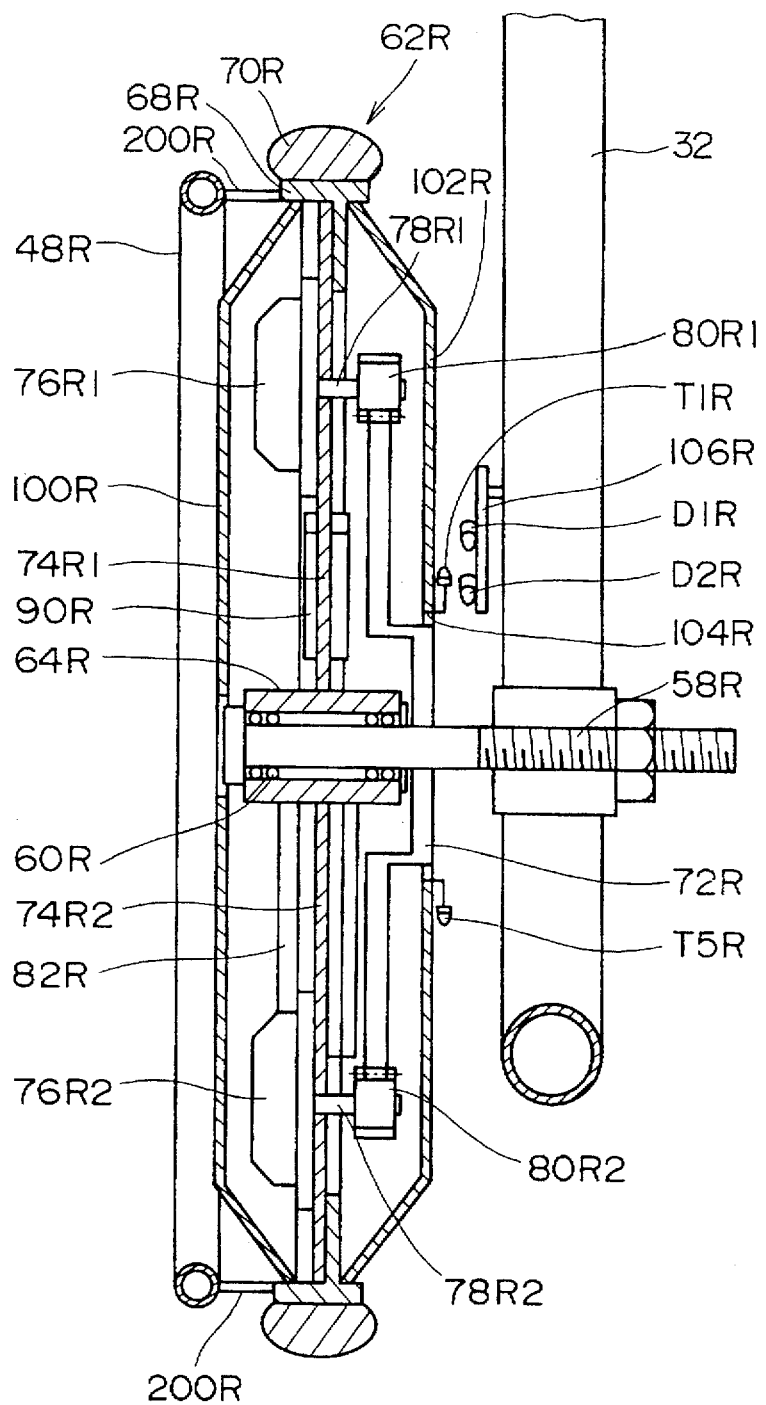
FIG. 6 is a cross-sectional view along a line VI—VI in FIG. 5.

As shown in FIGS. 5 and 6, the right-side drive wheel 46R includes an axle 58R secured to the chair body 32. A rotating section 62R is rotatably mounted on the axle 58R with a bearing 60R interposed therebetween. The rotating section 62R includes a hub 64R with the bearing 60R in it, and a plurality of spokes 66R extend radially from the hub 64R and connect at their distal ends to a substantially annular rim 68R. A tire 70R is mounted around the rim 68R.

As shown in FIG. 6, a gear 72R is fixed coaxial with the axle 58R. Two reinforcement panels 74R1 and 74R2 are disposed within diametrically opposing spaces each defined by two adjacent spokes 66R and are secured by clamps 73R to the wheels, and two motors 76R1 and 76R2 are secured by screws 75R to the respective reinforcement panels 74R1 and 74R2, as shown in FIG. 5. More than two motors may be used, and, in such a case, the motors are disposed on a circle concentric with the axle 58R at angularly equally separated locations. For example, if three motors are used, they are spaced by 120 degrees from each other.

Two pinions 80R1 and 80R2 are coaxially secured to the output shafts 78R1 and 78R2 of the motors 76R1 and 76R2. The pinions 80R1 and 80R2 are in mesh with the gear 72R. As the motors 76R1 and 76R2 are energized to rotate, the pinions 80R1 and 80R2 roll along the periphery of the gear 72R, which results in rotation of the rotating section 62R. The motors 76R1, 76R2, the gear 72R, and the pinions 80R1, 80R2 form electric driving means.

Two batteries 82R1 and 82R2 are mounted by means of support members 84R1 and 84R2 fitted and secured within spaces each defined by two adjacent spokes 66R. The batteries are disposed on a circle concentric with the axle 58R with the same angular spacing from each other as the angular spacing between the motors. In the illustrated embodiment, the angular spacing is 180 degrees. The battery 82R1 is spaced by 60 degrees from the associated motor 76R1 and by 120 degrees from the other motor 76R2, while the battery 82R2 is spaced from the associated motor 76R2 by 60 degrees, and by 120 degrees from the motor 76R1.

The control unit 88R and the driving unit 90R are disposed within respective spaces each defined by two adjacent spokes 66R. The angular spacing between the locations where the control unit 88R and the driving unit 90R are disposed is equal to the angular spacing between the motors 76R1 and 76R2, i.e. 180 degrees in the illustrated case. The spaces where the control unit 88R and the driving unit 90R are disposed are different from those where the motors and batteries are respectively disposed. The control unit 88R and the driving unit 90R may be disposed on plates which, in turn, are fitted within the respective spaces and secured to the respective spokes by means of, for example, clamps (not shown) like the clamps 73R.

By arranging the motors 76R1 and 76R2, the batteries 82R1 and 82R2, the control unit 88R, and the driving unit 90R as described above, the drive wheel 46R is balanced. It is noted that the motors 76R1, 76R2, the batteries 82R1, 82R2, the control unit 88R, and the driving unit 90R are positioned substantially in the same single plane within the rotating section 62R which is perpendicular to the axis of the axle 58R, which also facilitates the balancing of the drive wheel 46R.

As shown in FIG. 6, an outer cover 100R and an inner cover 102R are fixed to the rim 68R so as to enclose the motors 76R1 and 76R2, the gear 72R, the pinions 78R1 and 78R2, etc. therein.

The other, left-side drive wheel 46L is similarly constructed. Similar components are shown with the same reference numerals with a letter "L" attached at the end instead of "R", and their descriptions are not made.

Figure 7:
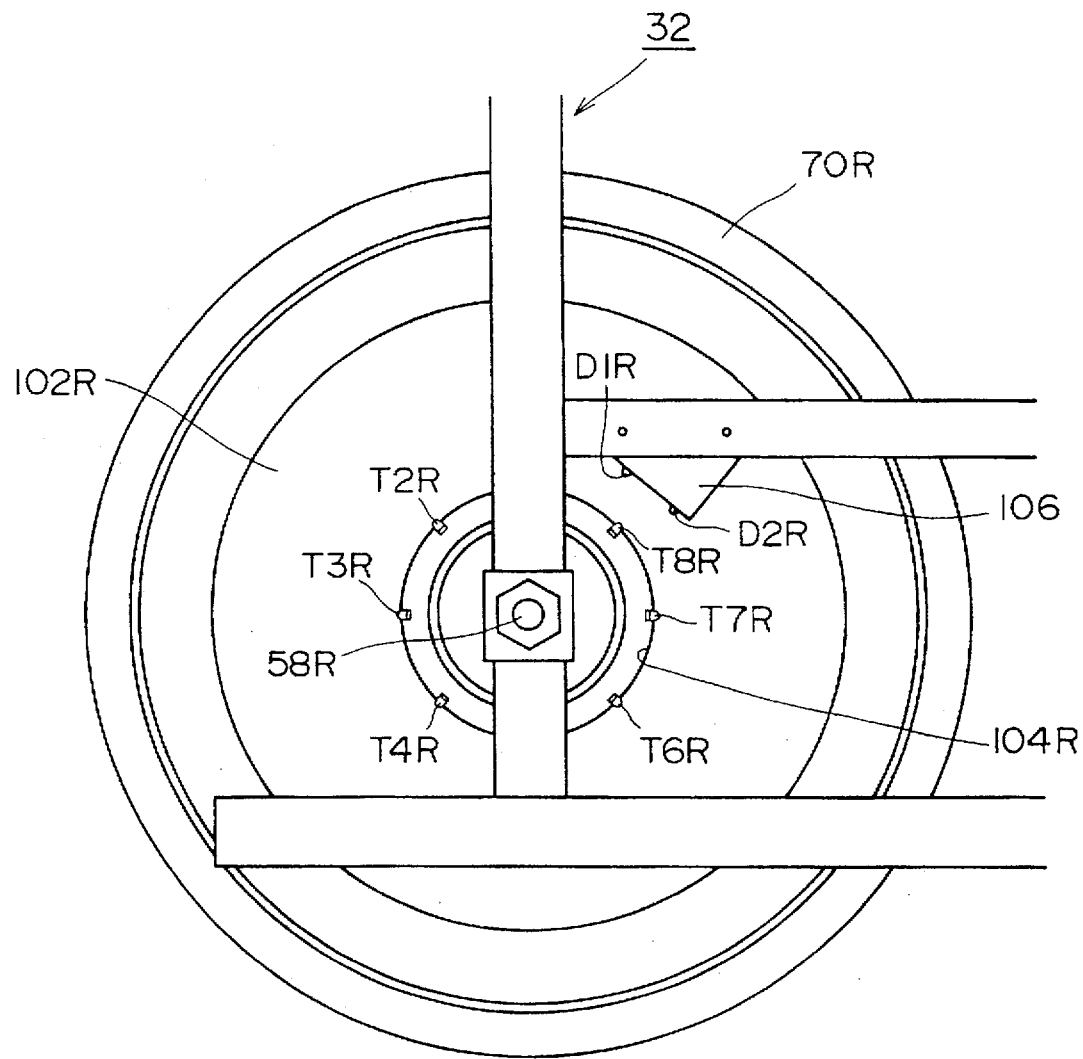
FIG. 7 is a left side view of the right-side drive wheel shown in FIG. 5.

As shown in FIGS. 6 and 7, the inner cover 102R has a circular opening 104R in its center which is concentric with the axle 58R. Plural, for example, eight, light-receiving elements, such as phototransistors, T1R–T8R which constitute the receiver unit 86R are equidistantly disposed along the periphery of the opening 104R. The phototransistors T1R–T8R are electrically connected in parallel.

Plural, for example, two, light-emitting elements, such as light-emitting diodes, D1R and D2R which constitute the transmitter unit 98R are disposed at predetermined locations which radially outward of the opening 104R. The light-emitting diodes D1R and D2R are fixed to a framework pipe of the chair body 32 by means of a mounting member 106R. The light-emitting diodes D1R and D2R are also electrically connected in parallel with each other. The phototransistors T1R–T8R rotate with the drive wheel 46R and, while they are rotating, receive infrared signals from the light-emitting diodes D1R and D2R.

Figure 8:
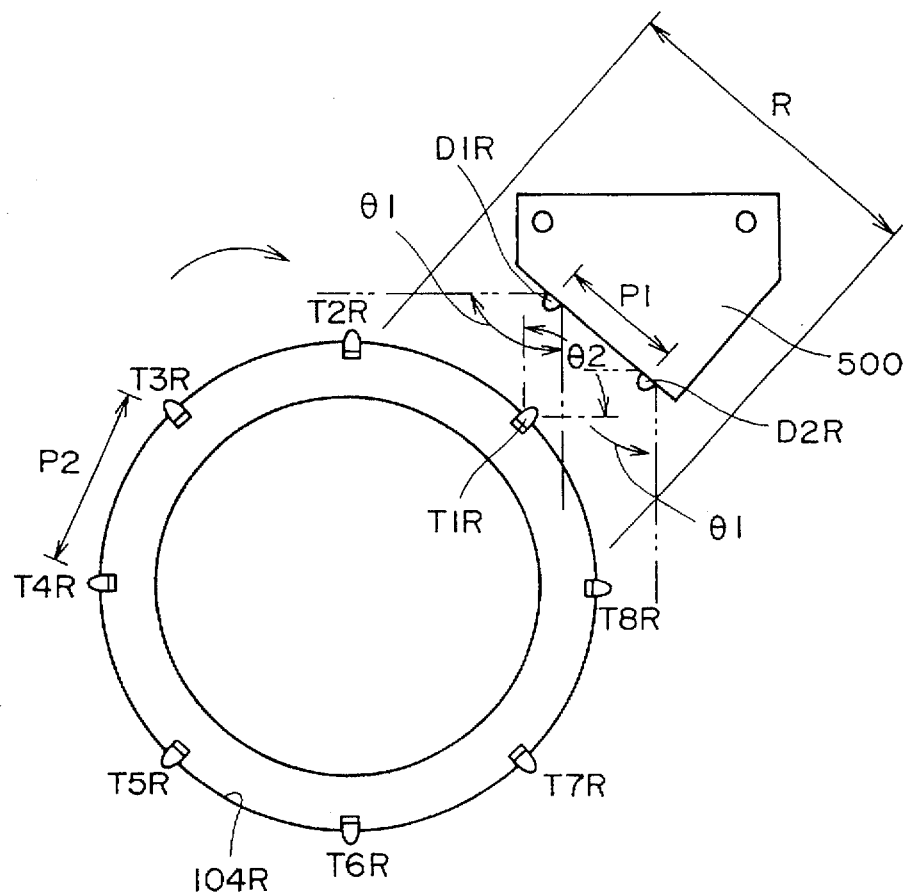
FIG. 8 is a diagram showing the relationship in position between light-emitting diodes and phototransistors used in the motor-driven wheelchair of FIG. 3.

As shown in FIG. 8, the spacing P2 between adjacent ones of the phototransistors T1R–T8R is determined such that at any time, one or more of the phototransistors T1R–T8R is present within their detectable range R which, in turn, is determined by the infrared signal radiation angle $\theta 1$ of the light-emitting diodes D1R and D2R, and the detectable light receiving angle $\theta 2$, the orbit and the sensitivity of the phototransistors T1R–T8R. More specifically, in the illustrated embodiment, it is desirable that the spacing P2 between adjacent ones of the phototransistors T1R–T8R and the spacing P1 between the two light-emitting diodes D1R and D2R be set to be such that P2/P1=1.5–0.5, for example.

In FIG. 8, when the drive wheel 46R rotates in the direction indicated by an arrow, current I flowing in the receiver unit 86R in response to light received is the combination of currents I1–I8 generated in the respective ones of the phototransistors T1R–T8R in response to light received by the respective phototransistors, as shown in FIG. 9. Thus, although more or less pulsating, the current I always flows. The smaller the ratio P2/P1, the pulsation of the current I is smaller, which is desirable. However, it may be compromised with the cost.

The structures of the receiver unit 86L and the transmitter unit 98L are substantially the same as those of the receiver unit 86R and the transmitter unit 98R, and, therefore, no detailed explanation about them is made.

Figure 1:
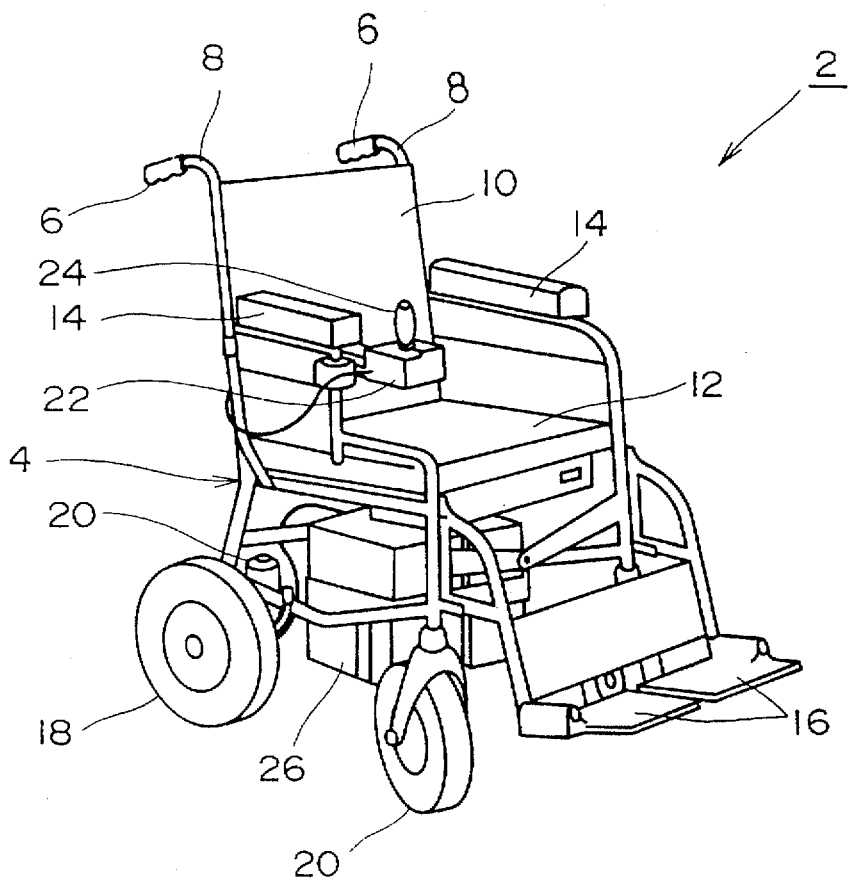
FIG. 1 is a perspective view of a prior art motor-driven wheelchair.
Figure 2:
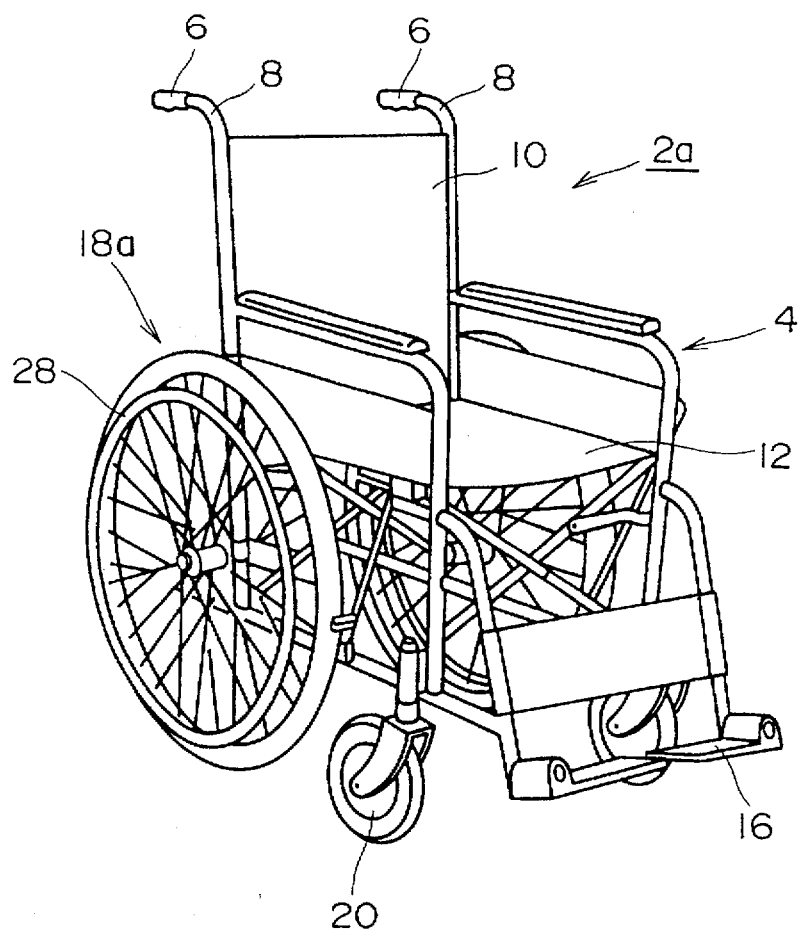
FIG. 2 is a perspective view of a conventional manually driven wheelchair.

A manually driven wheelchair such as the one 2a shown in FIG. 2 may be easily modified into the motor-driven wheelchair 30 by attaching the manual-driving-force sensing units 50R and 50L, the converting unit 56, and the transmitter units 98R and 98L on the wheelchair body 32, and mounting the motors 76R and 76L, the receiver units 86R and 86L, the control units 88R and 88L, the driving units 90R and 90L, and the batteries 82R and 88L within the respective drive wheels 46R and 46L. In this case, the larger the drive wheels 46R and 46L used, the larger space is available for the batteries so that larger capacity batteries can be used.

Each of the manual-driving-force sensing units 50R and 50L senses the magnitude and direction of force exerted to it, and the drive wheels 46R and 46L are driven in accordance with the sensed force, as described above.

One of the manual-driving-force sensing units, namely, the manual-driving-force sensing units 50L is now described in detail with reference to FIGS. 10 and FIGS. 10a and 10b. Although the details and operation of the other manual-driving-force sensing unit 50R are not shown or described, they are substantially the same as those of the sensing unit 50R.

Figure 10:
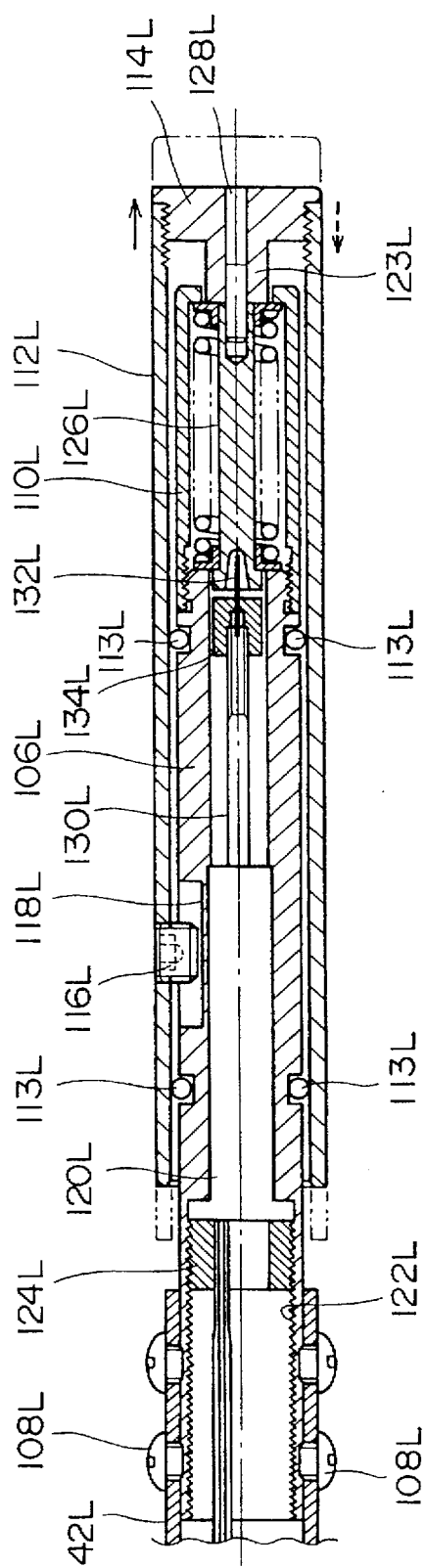
FIG. 10 is a longitudinal cross-sectional view of a manual-driving-force sensing unit in its neutral position of the motor-driven wheelchair of FIG. 3.

The manual-driving-force sensing unit 50L in its neutral position where no force is exerted to it, is shown in FIG. 10. The sensing unit 50L includes a cylindrical fixed portion 106L which has its one end inserted into the handlebar 42L formed of a pipe. The portion 106L is fixed to the handlebar 42L by means of screws 108L. A cylindrical member 110L has a chamber in which an elastic member 136, such as a spring described later in detail, is housed. The inner surface in one end portion of the cylindrical member 110L and is screwed over and joined to the other end of the fixed portion 106L. A grip 112L extending along the length of the fixed portion 106L houses the fixed portion 106L and the spring casing 110L. The grip 112L is displaceable along the length of the fixed portion by virtue of rolling steel balls 113L. The other end or end remote from the handlebar 42L of the grip 112L is provided with a lid 114L which closes the open end of the grip 112L. A stop 116L is formed in the interior of the grip 112L to engage with a recess 118L which is formed in the surface of the fixed portion 106L to extend along the length of the portion 106L. Thus, the grip 112L can be displaced along the length direction of the handlebar 42L within the range equal to the length of the recess 118L.

Displacement sensing means, such as a potentiometer, 120L is disposed within the fixed portion 106L. A fixing ring 124L which is screwed into a portion 122L having a thread formed in the inside surface of the fixed portion 106L fixes the potentiometer 120L with respect to the fixed portion 106L. A columnar member 123L protrudes from the center of the inner surface of the lid 114 toward the potentiometer 120L. A piston 126L having a diameter smaller than that of the columnar member 123L extends from the member 123L toward the potentiometer 120L along the length of the spring casing 110. The piston 126L is fixed to the lid 114L by means of a screw 128L.

Figures 10A, 10B:
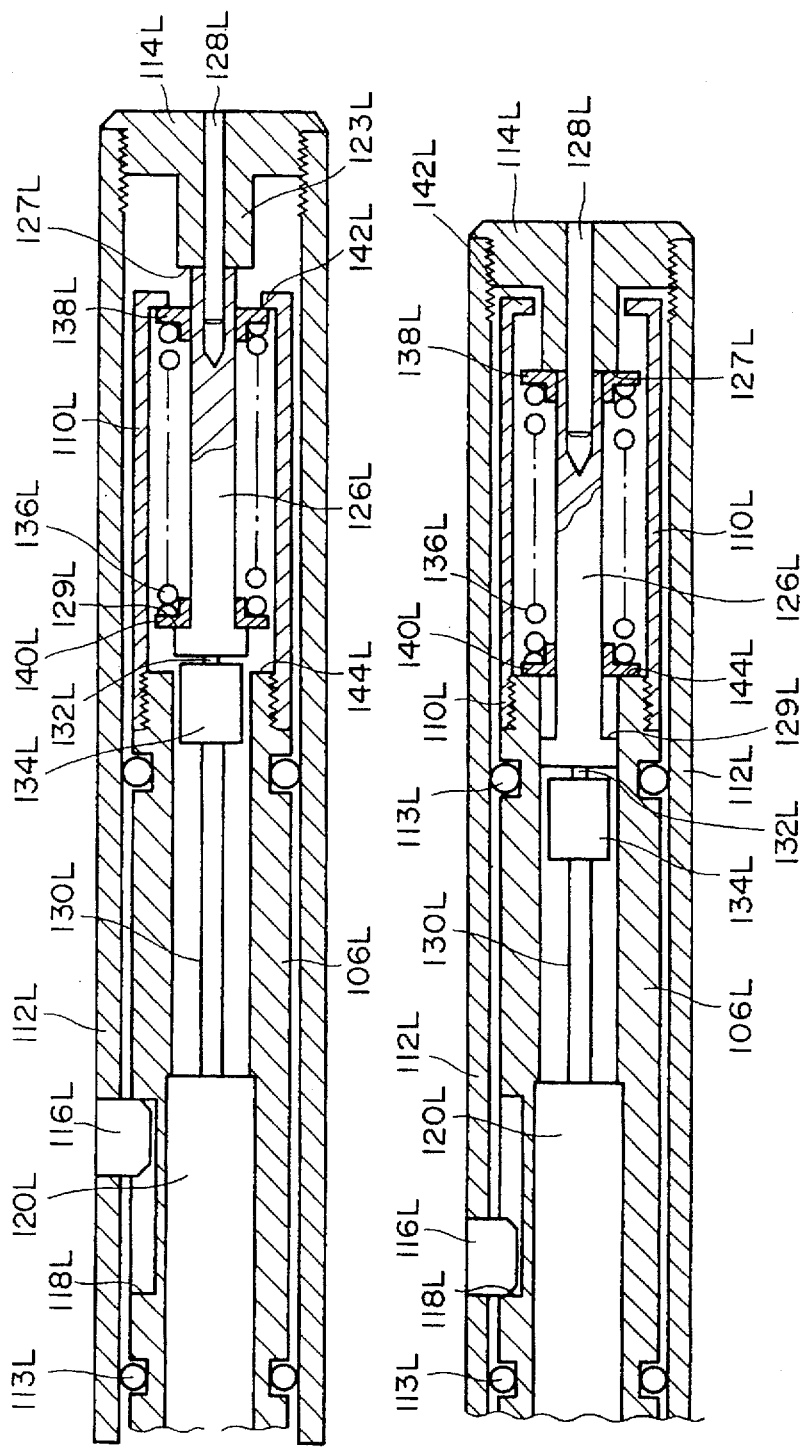
FIG. 10a is a similar cross-sectional view of the manual-driving-force sensing unit of FIG. 10 when a grip of the wheelchair is pulled.
FIG. 10b is a similar cross-sectional view of the manual-driving-force sensing unit when the grip is pushed.

As shown in FIG. 10a, elastic member driving means, such as a step or shoulder 127L is formed in the columnar member 123L at a portion where the piston 126L is joined to the columnar member 123L. The distal end of the piston 126L is formed to have a larger diameter and is provided with elastic member driving means, such as a step or shoulder 129L. As shown in FIG. 10, the enlarged distal end of the piston 126L is coupled by a connecting wire 132L and an attachment 134L to a sensing element 130L. Thus, when the grip 112L is displaced to and fro, the piston 126L and, hence, the sensing element 130L, are also displaced, accordingly.

Within the chamber of the spring casing 110L, disposed is an elastic member, such as a spring, 136L. The two ends of the spring 136L are in contact with respective spring holder rings 138L and 140L which are mounted on the piston 126L in such a manner as to be slidable on the piston 126L. Stops, such as steps, 142L and 144L are provided at opposite ends of the chamber of the spring casing 110L, so that the spring holder rings 138L and 140L can be contacted with them. The rings 138L and 140L can contact also with the shoulders 127L and 129L of the piston 126L. When the grip 112L is not displaced, i.e. when the grip 112L is in its neutral position, as shown in FIG. 10, the ring 138L is in contact with the step 142L at the end of the chamber closer to the lid 114L as well as the shoulder 127L of the piston 126L, while the ring 140L is in contact with the shoulder 144L of the fixed portion 106L as well as the step 129L of the piston 126L. The distance between the steps 142L and 144L is equal to the distance between the shoulders 127L and 129L, so that the grip 112L is restricted in a predetermined neutral position (shown in FIG. 10) by the repulsion of the spring 136, in which position the grip 112L is not actuated and the rings 138L and 140L are in contact with the steps 142L and 144L, respectively. In order to retain the grip 112L in this predetermined position, it is desirable that the spring 136L be pre-compressed when it is disposed within the chamber of the spring casing 110L.

When manual driving force F1L is exerted to the grip 112L in the neutral position in such a direction that it is displaced toward handlebar 42L of the wheelchair as shown in FIG. 10b, the spring holder ring 140L does not move since it is in contact with the step 144L of the spring casing 110L. On the other hand, the spring holder ring 138L is pushed toward the handlebar 42L by the shoulder 127L of the piston 126L, which, in turn, causes the spring 136L to be compressed and, at the same time, causes the piston 126L to push the sensing element 130L toward the handlebar 42L.

When manual driving force F1L is exerted in the opposite direction so that the grip 112L is displaced away from the handlebar 42L as shown in FIG. 10a, the spring holder ring 138L does not move since it is in contact with the step 142L of the spring casing 110L. However, the ring 140L in contact with the shoulder 129L of the piston 126L is pushed away from the handlebar 42L by the piston 126L so that the sensing element 130L is pulled out.

When the manual driving force F1L is removed, the repulsion of the spring 136L brings the grip 112L to its original, predetermined neutral position.

As stated above, depending on the direction of the manual driving force F1L exerted to the grip 112L, the direction of displacement of the sensing element 130L is determined, and the amount of displacement of the sensing element 130L is in proportion to the magnitude of the manual driving force F1L.

Figure 11:
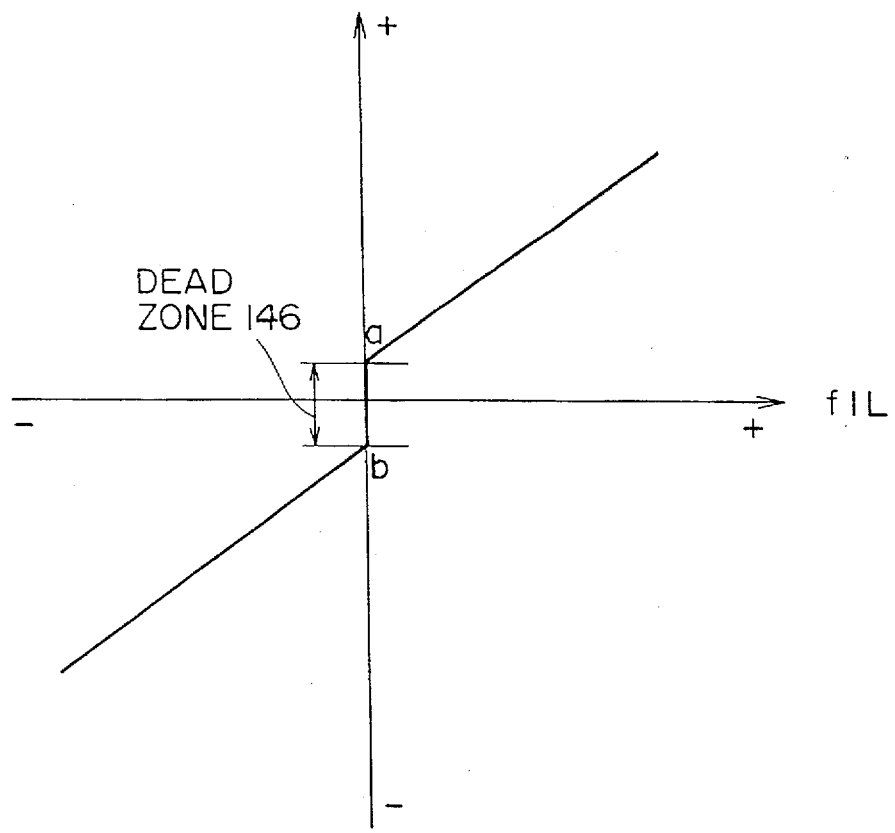
FIG. 11 is a diagram showing the relationship between manual driving force applied to the manual-driving-force sensing unit and the displacement of the manual-driving-force sensing unit.

A manual-driving-force sensing circuit, such as a Wheatstone bridge circuit, in the manual-driving-force sensing unit 50L (FIG. 4) including the potentiometer 120L senses the direction and magnitude of the manual driving force F1L and develops an analog electrical signal f1L. As shown in FIG. 11, the analog signal f1L represents the direction and magnitude of the force applied to the grip 112L.

In FIG. 11, a reference numeral 146 denotes a dead zone which is present due to the pre-compression of the spring 136L. Only when the manual driving force F1L exceeds values a and b defining the limits of the dead zone 146, an analog signal f1L is generated. The width of the dead zone 146 can be adjusted by adjusting the degree of the precompression of the spring 136L.

In FIG. 11, a symbol "+" indicates that the manual driving force F1L is in the direction to push in the grip 112L or to displace it toward the handlebar 42L, whereas a symbol "−" indicates that the force F1L is exerted in the direction to pull out the grip 112L or to displace it away from the handlebar 42L.

Although not shown, a similar manual-driving-force sensing arrangement 50R is provided for the right-hand handlebar 42R, and the manual-driving-force sensing unit 50R develops a similar analog electrical signal f1r representing the direction and magnitude of an exerted force F1R.

The signals f1R and f1L are converted into digital signal Df1R and Df1L in the A/D converter 92 in the signal converting unit 56, and, then, converted in the CPU 94 into motor-torque related signal Df2R and Df2L, respectively. The digital motor-torque related signals Df2R and Df2L are applied to the transmitter units 98R and 98L, respectively, for transmission to the receiver units 86R and 86L, as described previously.

The relationship between the digital motor-torque related signal Df2R and the manual driving force F1R which is represented by the digital signal Df1R which, in turn, is proportional to the manual driving force F1R, is shown in FIG. 12a, and the relationship between the digital signal Df1R and the acceleration of the motor-driven wheelchair 30 is shown in FIG. 12b.

As will be understood from FIG. 12a, when the manual driving force F1R is within the dead zone 146 in FIG. 11 and, therefore, the digital signal Df1R is within a dead zone, shown in FIG. 12a, which corresponds to the dead zone 146, and which is defined by values a' and b' that correspond to the values a and b of the manual driving force F1R shown in FIG. 11, the digital motor-torque related signal Df2R remains 0. As the manual driving force F1R increases so that the digital signal Df1R increases beyond the value a', the digital motor-torque related signal Df2R is expressed as $K \cdot Df1R - \alpha$ and is proportional to the digital signal Df1R and, hence, to the manual driving force F1R. When the manual driving force F1R is smaller so that the digital signal Df1R is less than the value b', the digital motor-torque related signal Df2R is expressed as $K \cdot Df1R + \beta$ and is proportional to the digital signal Df1R and, hence, to the manual driving force F1R. In the two expressions, K is a coefficient, and $\alpha$, and $\beta$ are constants.

When, for example, the digital signal Df1R is at a point C in FIG. 12a, that is, when no manual driving force F1R is exerted, the motor-torque related digital signal Df2R is also zero, and, therefore, as shown in FIG. 12b, the acceleration is also zero.

When the digital signal Df1R is at a point B which is within the dead zone, the motor-torque related signal Df2R remains zero, but the acceleration increases by an amount corresponding to the manual driving force F1R exerted to the wheelchair by an attendant. At a point A, the digital signal Df1R is greater than the value a', which means that a manual driving force F1R which exceeds the value a shown in FIG. 11 is exerted, acceleration is generated by the motor 76R, and the sum of the acceleration produced by the manual driving force F1R exerted by the attendant and the acceleration produced by the motor 76R is given to the wheelchair 30. The points A and B are exemplified to explain cases in which the attendant accelerates the wheelchair.

On the other hand, the digital signals Df1R at points D and E correspond to manual driving forces F1R which are exerted to the wheelchair by the attendant to decelerate the wheelchair. The motor-torque related digital signal Df2R and the acceleration exhibit point-symmetry with the point C being a point of symmetry.

At the points A and E, the wheelchair 30 is accelerated by both the manual driving force F1R given by the attendant and the driving force given by the motor 76R, with the motor-torque varying in accordance with the magnitude of the manual driving force F1R. Thus, the wheelchair 30 is driven by the collaboration of the attendant and the motor 76R.

Also, it is arranged that the same relationship exists between the digital signal Df1L or the manual driving force F1L and the motor-torque related signal Df2L. Thus, the acceleration produced by the motor 76R is controlled in accordance with the manual driving force F1R as sensed by the manual-driving-force sensing unit 50R, and the acceleration produced by the motor 76L is controlled in accordance with the manual driving force F1L as sensed by the manual-driving-force sensing unit 50L.

FIGS. 12a and 12b show the motor-torque related signal and the acceleration when the wheelchair 30 is driven on a horizontal, flat path. When the wheelchair 30 is driven to ascend or descend a slope, the accelerations provided by the motors 76R and 76L change depending on the magnitudes of the manual driving forces F1R and F1L which are exerted in the direction opposing the gravitational acceleration.

The dead zone is for preventing unstable movement of the wheelchair 30 which could be caused if the motors 76R and 76L respond to small manual driving forces F1R and F1L.

The coefficient K, the constants $\alpha$ and $\beta$, the limit values a and b of the dead zone 146 or the values a' and b' of the dead zone of the digital signal Df1R, Df1L are so set that desired accelerations can be provided in accordance with the manual driving force F1R, F1L.

Since the motors 76R and 76L are driven in accordance with the manual driving forces F1R and F1L provided by an attendant, as described above, the wheelchair 30 can be driven as driving a manually driven wheelchair. This is described further with reference to FIGS. 13a and 13b.

Figures 13A, 13B:
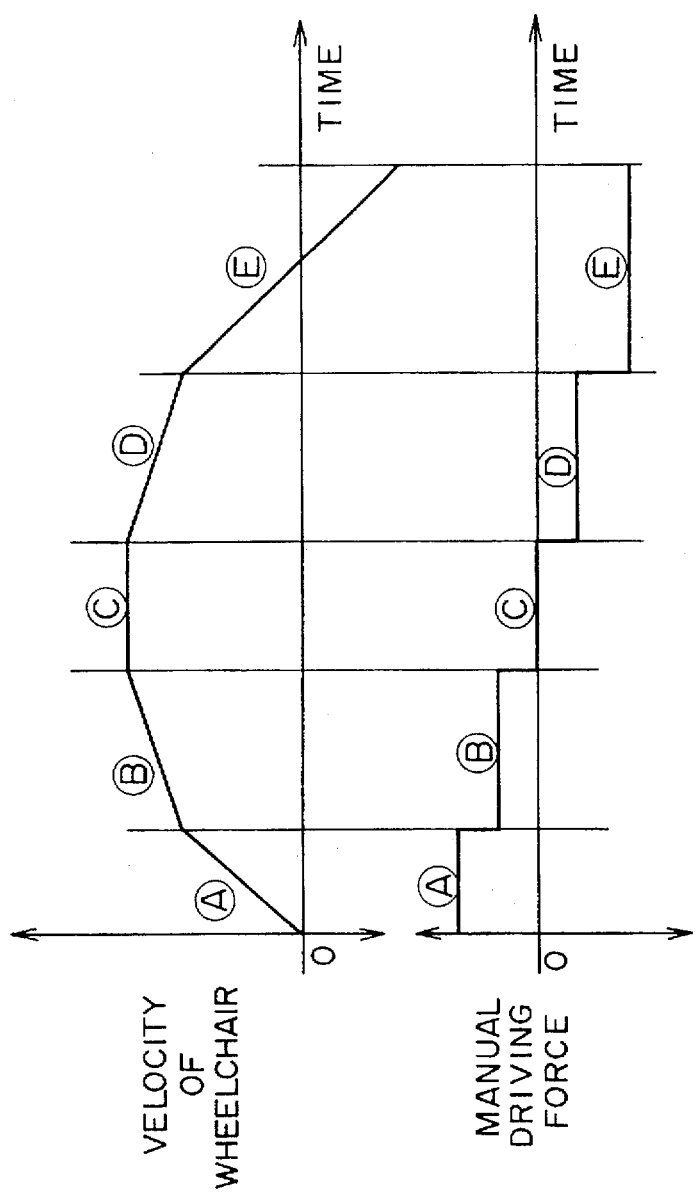
FIG. 13a shows an example of change in velocity of the motor-driven wheelchair with time.
FIG. 13b shows an example of change in manual driving force exerted to the motor-driven wheel chair with time.

FIG. 13a shows variations with time in velocity of the wheelchair 30, and FIG. 13b shows the manual driving forces F1R and F1L exerted to the manual-driving-force sensing units 50R and 50L which cause the variations in velocity of the wheelchair 30 shown in FIG. 13a, assuming that the manual driving forces F1R and F1L are equal to each other. When the manual driving forces are positive (+) (i.e. they act in the direction to move forward the wheelchair 30) and their absolute values are large as in a region A in FIG. 13b, the advancing velocity increases at a high rate as shown in a region A in FIG. 13a. When the manual driving forces are positive with their absolute values being small as in a region B (FIG. 13b), the rate of increase of the wheelchair advancing velocity is gradual as shown in FIG. 13a. When the manual driving forces applied are zero as in a region C in FIG. 13b, the velocity of the wheelchair 30 does not change and the wheelchair moves forward by inertia as shown in FIG. 13a in a region C.

When the manual driving forces are negative (−) (i.e. they act in the direction to move the wheelchair 30 backward) with their absolute values being small as in a region D in FIG. 13b, the advancing velocity of the wheelchair 30 decreases gradually, as in a region D in FIG. 13a. If the manual driving forces are negative and their absolute values are large as in a region E, the velocity decreases rapidly, It should be noted that FIGS. 13a and 13b represent an ideal condition in which there is no friction loss.

In the above description, simple acceleration and deceleration of the wheelchair 30 have been described. It should be noted that since the motors 76R and 76L are controlled independently of each other in response to the manual driving forces as exerted to and sensed by the manual-driving-force sensing units 50R and 50L, respectively, the wheelchair 30 can change its direction of movement. The direction changing operation of the wheelchair 30 is now described with reference to the following TABLE.

TABLE

| Case | Manual Driving Forces | | Movement of Wheelchair |
|---|---|---|---|
| | F1L | F1R | |
| 1 | 0 | 0 | Steady Movement |
| 2 | (+) Small | (+) Small | Small Acceleration |
| 3 | (+) Large | (+) Large | Large Acceleration |
| 4 | (−) Small | (−) Small | Small Deceleration |
| 5 | (−) Large | (−) Large | Large Deceleration |
| 6 | (+) Small | (+) Large | Turning Left |
| 7 | (−) Small | (+) Large | Rapidly Turning Left |
| 8 | (−) Large | (+) Large | Rotating Counterclockwise |
| 9 | (+) Large | (+) Small | Turning Right |
| 10 | (+) Large | (−) Small | Rapidly Turning Right |
| 11 | (+) Large | (−) Large | Rotating Clockwise |

In Cases 1 through 5 in the TABLE, the manual driving forces F1R and F1L acting on the manual-driving-force sensing units 50R and 50L are equal to each other. Case 1 corresponds to the region C in FIG. 13a, Case 2 corresponds to the region B, Case 3 corresponds to the region A, Case 4 corresponds to the region D, and Case 5 corresponds to the region E of FIG. 13a. In each of Cases 2–5, the magnitude of the manual driving forces F1R and F1L are outside the dead zone 146 shown in FIG. 11, which are sufficient to develop the electrical signals f1R and f1L of magnitudes falling outside the dead zone shown in FIG. 12a.

In each of Cases 6 through 11, the manual driving forces F1R and F1L differ from each other. In these cases, the motors 76R and 76L help the wheelchair 30 change its direction of movement.

In Case 6, the manual driving force F1L is in the positive direction and the absolute value of its magnitude is small, while the manual driving force F1R is also in the positive direction, but the absolute value of its magnitude is larger. In this case, the acceleration provided by the motor 76L and the acceleration provided by the manual driving force F1L the attendant exerts to the wheelchair 30 are summed and applied to the drive wheel 46L, while the sum of the acceleration provided by the motor 76R and the acceleration provided by the manual driving force F1R exerted by the attendant is applied to the drive wheel 46R. Although both manual driving forces F1R and F1L are in the same direction, the magnitude of F1R is larger than that of F1L. Accordingly, the acceleration of the drive wheel 46R is larger than that of the drive wheel 46L. This causes the motor-driven wheelchair 30 to turn left.

In Case 7, the manual driving force F1L is negative and its absolute value is small, while the manual driving force F1R is positive and its absolute value is large. In this case, the acceleration of the drive wheel 46R is similar to that in Case 6. However, the acceleration of the drive wheel 46L is in the opposite direction to that in Case 6. Accordingly, the wheelchair 30 turns left rapidly.

In Case 8 where the manual driving force F1L is negative and large in absolute value, while the manual driving force F1R is positive and large in absolute value, the acceleration of the drive wheel 46R is similar to that in Case 6 and the acceleration of the wheel 46L is in the opposite direction to that in Case 6 and large. Accordingly, the wheelchair 30 rotates counterclockwise.

In Case 9, the manual driving force F1L is positive and large in absolute value, whereas the manual driving force F1R is negative and small in absolute value. This situation is opposite to Case 6, and, therefore, the wheelchair 30 turns right.

When the manual driving force F1L is positive and large in absolute value, while the manual driving force F1R is negative and small in absolute value, as in Case 10, the wheelchair 30 turns right rapidly, which is opposite to Case 7.

In Case 11, the manual driving force F1L is positive and its absolute value is large, whereas the manual driving force F1R is negative and large in absolute value. This is a case opposite to Case 8, so that the wheelchair 30 rotates clockwise.

As described above, the accelerations of the motors 76R and 76L respectively coupled to the drive wheels 46R and 46L vary in accordance with the manual driving forces F1R and F1L, respectively.

Figure 14:
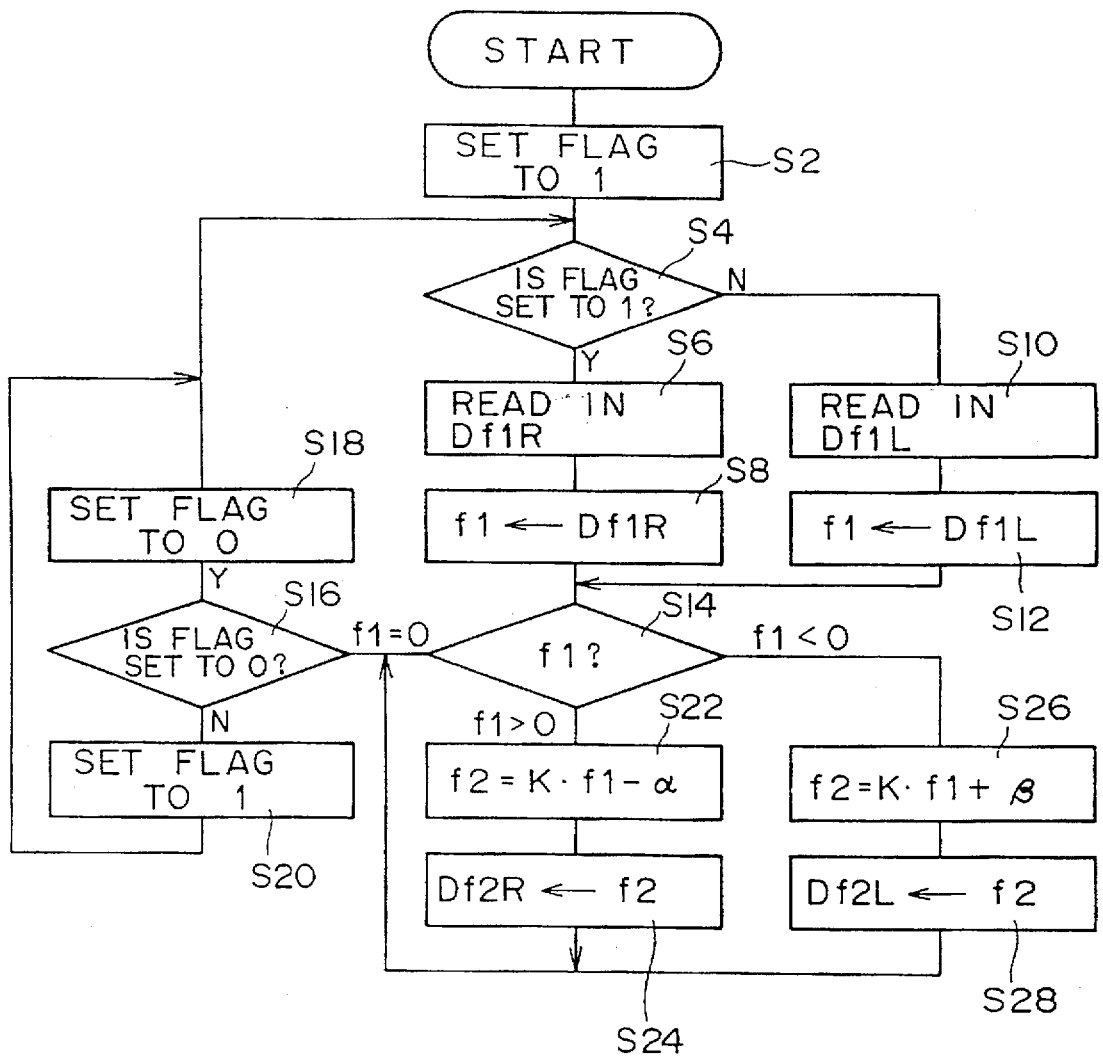
FIG. 14 is a flow chart showing the arithmetic processing by a CPU in a signal converting unit of the wheelchair shown in FIG. 3.

In order to control the acceleration and direction of movement of the wheelchair 30 as described, the CPU 94 in the signal converting unit 56 performs arithmetic operations as shown in the flow chart of FIG. 14.

Immediately after the start of the arithmetic operation, a flag indicating which signal is to be processed, a signal from the manual-driving-force sensing unit 50R or a signal from the manual-driving-force sensing unit 50L, is set to, for example, a value "1", which means that the signal from the unit 50R is to be processed (STEP S2). Next, whether the flag is set to "1" or not is determined (STEP S4). If the flag is set to "1" (i.e. the judgment made by STEP S4 is YES), the digital signal Df1R from the A/D converter 92 is read in the CPU 94 (STEP S6), and is stored therein as data f1 for use in the succeeding arithmetic operations (STEP 8).

If it is determined in STEP S4 that the flag is set to "1" (i.e. the judgment made in STEP S4 is NO), the digital signal Df1L is read into the CPU 94 from the A/D converter 92 (STEP S10), and is stored therein as data f1 for use in the succeeding arithmetic operations (STEP S12).

After STEP S8 or S12, the magnitude of the data f1 is judged (STEP S14). If the data f1 is 0, for example, which means that the data f1 is within the dead zone, no acceleration is given to the wheelchair by the motor 76R or 76L.

Next, in order to process a signal from the other manual-driving-force sensing unit, judgment is made as to whether the flag is set to "1" or not (STEP S16). If the answer is YES, the flag is set to "0" in order to next process the signal from the manual-driving-force sensing unit 50L (STEP S18), and the processing returns to STEP S4.

If the judgment made in STEP S16 is NO, the flag is set to "1" in order to next process the signal from the manual-driving-force sensing unit 50R (STEP S20), and the processing returns to STEP S4.

If the data f1 is judged to be larger than 0 in STEP S14, an operation $f2=K \cdot f1-\alpha$ is carried out (STEP S22). The amplifier 96 is controlled so that the result of the arithmetic operation, i.e. data f2, is developed as the motor-torque related digital signal Df2R (STEP S24).

On the other hand, if the data f1 is judged to be less than 0 in STEP S14, an arithmetic operation $f2=K \cdot f1+\beta$ is performed (STEP S26), and the amplifier 96 is so controlled that the result of the arithmetic operation, i.e. data f2, is outputted as the motor-torque related digital signal Df2L (STEP S28).

Following STEP S24 or S28, STEPS S16 and S18 or STEPS S16 and S20 are successively performed, and thereafter, STEP S4 is performed, in order to process the signal from the other manual-driving-force sensing unit.

In the manner as stated above, the digital electrical signals Df1R and Df1L are alternately read into the CPU 94, and the motors 76R and 76L are controlled to produce acceleration as determined by the signals Df1R and Df1L, respectively.

Figure 15:
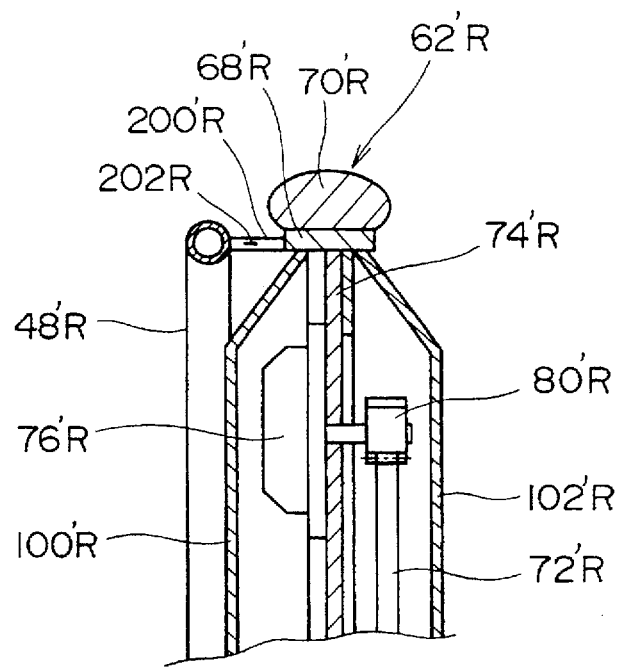
FIG. 15 is a cross-section view of part of a right-side drive wheel of a motor-driven wheelchair according to a second embodiment of the present invention.

FIG. 15 shows a right-hand side drive wheel 62'R for use in a motor-driven wheelchair according to a second embodiment of the present invention. In FIG. 15, the same reference numerals with a prime (') added are used for similar components of the first embodiment, and detailed explanation about them is not made.

A hand rim 48'R is attached to a rim 68'R by means of a plurality of spacers 200'R. A strain gage 202R is mounted on at least one of the spacers 200'R. It is intended that the wheelchair with this type of drive wheels is normally driven by a person sitting on the wheelchair by manually rotating the hand rims to thereby rotate the drive wheels. However, when, for example, the wheelchair comes to a slope and the user cannot climb it up by himself, the driving forces are supplemented by the driving forces given by motors.

The strain gage 202R senses the manual driving force exerted to the wheelchair body by the user through the hand rim 48'R, and the sensed force is applied to the signal converting unit 56 (FIG. 4) where an electrical signal corresponding to the sensed force is generated. Specifically, the manual driving force exerted by the user to the hand rim 48'R is transmitted through the spacers 200'R to the drive wheel 62'R. The spacers 200'R are subjected to bending stress so that the strain gage 202R receives a compressive force or tensile force depending on the magnitude and direction of the manual driving force exerted by the user to move forward or backward the wheelchair. With the manual driving force exceeding a predetermined magnitude, the motor 76'R produces a driving force in accordance with the magnitude of the manual driving force. With this arrangement in which the motor 76'R does not operate unless the manual driving force exceeds a predetermined value, the motor 76'R can be used as supplemental driving means supplementing the manual driving of the wheelchair, and, therefore, the capacity of a battery 82'R for energizing the motor 76'R need not be so large.

A similar arrangement including a strain gage is provided for controlling the other drive wheel 62'L (not shown).

Thus, the structure of the motor-driven wheelchair according to the second embodiment of the present invention is same as that of the wheelchair according to the first embodiment, except that in place of the manual-driving-force sensing units 50R and 50L of the first embodiment, strain gages are used, and a switch is used to place the respective motors 76'R and 76'L in the standby state so that the motors can be activated when it becomes necessary. The switch may be provided on a control panel (not shown) which may be manipulated by the user as occasion demands. Alternatively, the switch may be disposed at an appropriate location on either one of the drive wheels 62'R and 62'L within the user's reach, so that all components of the motor-driving arrangement can be placed on the drive wheels. With this arrangement, the structure of the wheelchair is further simplified.

Figure 17:
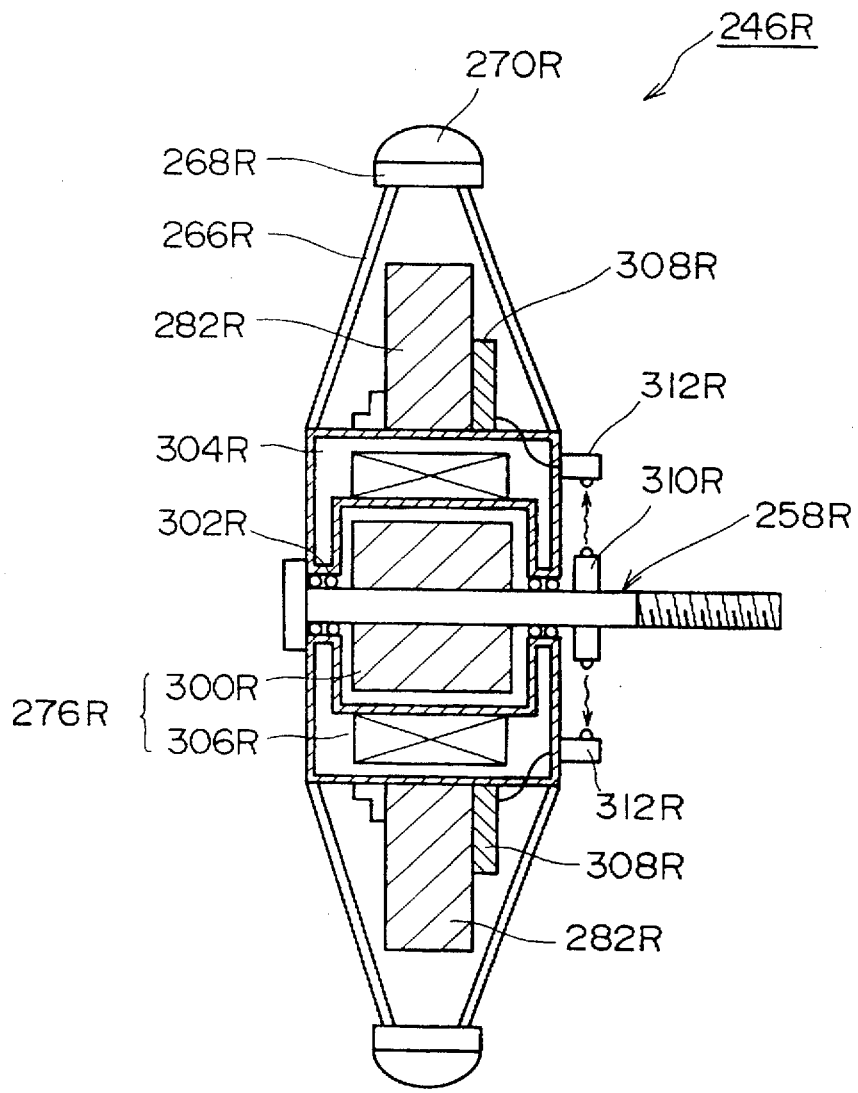
FIG. 17 is a cross-sectional view along a line XVII—XVII in FIG. 16.

FIGS. 16 and 17 show a drive wheel 246R for use in a motor-driven wheelchair according to a third embodiment of the present invention. A drive wheel of the same structure is used as a left-hand side drive wheel 246L (not shown). The wheelchair according to the third embodiment has the same structure as that of the wheelchair according to the first embodiment, except the drive wheels 246R and 246L. A permanent magnet 300R constituting part of a wheel driving motor 276R is secured to an axle 258R of the drive wheel 246R. A housing 304R is rotatably mounted on the axle 358R with a bearing 302R disposed between them. A coil 306R of the motor 276R is disposed to surround the magnet 300R within the housing 304R. A plurality of spokes 266R extend radially from the housing 304R and a wheel rim 268R.

Two batteries 282R are disposed at diametrically opposite locations on a circle concentric with the axle 258R outside the housing 304R inward of the spokes 266R. Driving and controlling units 308R for the motor 276R are disposed on the batteries 282R on the chair body sides thereof.

A transmitter unit for transmitting a light signal from a signal converting unit disposed on the chair body is disposed on the axle 258R at a location near the chair body side of the housing 304R. The transmitter unit may comprise at least two angularly spaced light-emitting diodes 310R secured to the axle 258R. A receiver unit is disposed on the chair body side of the housing S04R at such a location that it can receive a light signal from the transmitter unit. The receiver unit may comprise at least two angularly spaced light-receiving elements, such as phototransistors 312R. The transmitter unit, the receiver unit, and the signal converting unit of the third embodiment operate in the same manner as those of the first embodiment.

Since the motors 276R, 276L and the drive wheel axles 258R, 258L are integral, the motor coils 306R, 306L receiving power from the batteries 282R, 282L can be placed within the housings 304R, 304L of the drive wheels 246R, 246L, which eliminates wiring between the rotary components and the stationary components.

In FIG. 16 and 17, reference numerals 268R and 270R denote a rim and a tire, respectively.

In all of the above-described embodiments, two drive wheels are used. However, it may be arranged that four follower wheels are used at respective four corners of a wheelchair with a single drive wheel disposed intermediate between the two rear follower wheels.

What is claimed is:

1. A motor-driven vehicle comprising:

a vehicle body including a handlebar;

a drive wheel mounted to said vehicle body;

driving means for driving said drive wheel; and manual-driving-force sensing means for sensing a manual driving force exerted to said handlebar to move said vehicle body and generating a control signal for controlling said driving means in accordance with the sensed manual driving force;

said manual-driving-force sensing means comprising:

a displaceable grip mounted displaceable along the length of said handlebar;

displacement sensing means for sensing displacement of said grip and generating said control signal in accordance with the sensed displacement of said grip;

first and second stop members disposed spaced from each other along the length of said handlebar;

single elastic means having one end contacting said first stop member and having the other end contacting said second stop member; and piston means having first and second elastic means driving portions adjacent to said first and second stop members, respectively;

wherein:

when said grip is displaced in the direction from said one end of said elastic means toward said other end of said elastic means, said piston means causes said first elastic means driving portion to disengage said one end of said elastic means from said first stop member and to press said elastic means against said second stop member by an amount determined in accordance with the amount of displacement of said grip; and when said grip is displaced in the direction from said other end of said elastic means toward said one end of said elastic means, said piston means causes said second elastic means driving portion to disengage said other end of said elastic means from said second stop member and to press said elastic means against said first stop member by an amount determined in accordance with the amount of displacement of said grip.

2. The motor-driven vehicle according to claim 1 wherein said grip is disposed to surround said first and second stop members, said elastic means and said piston means.

3. The motor-driven vehicle according to claim 1 wherein said elastic means is pre-compressed between said first and second stop members so that, when said grip is not displaced in either direction, said one end of said elastic means is in contact with said first stop member and said other end of said elastic means is in contact with said second stop member.

4. A motor-driven vehicle comprising:

a vehicle body including a handlebar;

a drive wheel mounted to said vehicle body;

driving means for driving said drive wheel; and manual-driving-force sensing means for sensing a manual driving force exerted to said handlebar to move said vehicle body and generating a control signal for controlling said driving means in accordance with the sensed manual driving force;

said manual-driving-force sensing means comprising:

first and second stop members spaced from each other on a line extending away from one end of said handlebar in the length direction of said handlebar, said first and second stop members being secured to said handlebar;

a single elastic means;

first elastic means holding means engaging with one end of said elastic means, said first elastic means holding means being engageable with said first stop member and displaceable along said line;

second elastic means holding means engaging with the other end of said elastic means, said second elastic means holding means being engageable with said second stop member and displaceable along said line;

a displaceable grip disposed to surround said first and second stop members, said grip being displaceable along the direction of said handlebar;

elastic means driving means including a drive shaft disposed within said displaceable grip along the length direction of said handlebar in such a manner that said drive shaft can be displaced as said grip is displaced, a first elastic means driving portion which is coupled to said drive shaft and is engageable with said first elastic means holding means, and a second elastic means driving portion which is coupled to said drive shaft and is engageable with said second elastic means holding means;

wherein the displacement of said drive shaft in the direction toward said second stop member causes said first elastic means driving portion to disengage said first elastic means holding means from said first stop member and causes said second elastic means driving portion to be disengaged from said second elastic means holding means, and the displacement of said drive shaft in the direction toward said first stop member causes said first elastic means driving portion to be disengaged from said first elastic means holding means and causes said second elastic means driving portion to disengage said second elastic means holding means from said second stop member;

said manual-driving-force sensing means further comprising displacement sensing means disposed within said displaceable grip for sensing displacement of said grip and generating said control signal in accordance with the sensed displacement of said grip.

5. The motor-driven vehicle according to claim 4 wherein said elastic means is in the form of a coil to surround said drive shaft.

6. The motor-driven vehicle according to claim 4 wherein said displacement sensing means include a potentiometer secured between said handlebar and said first stop member, said potentiometer including a manipulating member displaceable along the length direction of said handlebar, said manipulating member being coupled to said drive shaft of said elastic means driving means.

* * * * *